United States Patent
Huberman et al.

(10) Patent No.: US 11,617,137 B1
(45) Date of Patent: Mar. 28, 2023

(54) POWER-EFFICIENT COORDINATED MULTIPOINT TRANSMISSION IN MILLIMETER-WAVE SMALL CELLS-POWER

(71) Applicant: CABLE TELEVISION LABORATORIES, INC., Louisville, CO (US)

(72) Inventors: Bernardo Huberman, Palo Alto, CA (US); Lin Cheng, Superior, CO (US); Mu Xu, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 65 days.

(21) Appl. No.: 17/220,708

(22) Filed: Apr. 1, 2021

Related U.S. Application Data (60) Provisional application No. 63/006,251, filed on Apr. 7, 2020, provisional application No. 63/003,361, filed on Apr. 1, 2020.

(51) Int. Cl.
| | | |
|---|---|---|
| *H04W 52/22* | (2009.01) | |
| *H04W 24/08* | (2009.01) | |
| *H04W 72/04* | (2009.01) | |
| *H04W 24/10* | (2009.01) | |
| *H04W 72/044* | (2023.01) | |

(52) U.S. Cl.
CPC ......... *H04W 52/225* (2013.01); *H04W 24/08* (2013.01); *H04W 24/10* (2013.01); *H04W 72/0406* (2013.01); *H04W 72/0473* (2013.01)

(58) Field of Classification Search
CPC .............................. H04W 76/16; G06Q 40/06
USPC ......................................................... 705/368
See application file for complete search history.

(56) References Cited

U.S. PATENT DOCUMENTS

| | | | |
|---|---|---|---|
| 10,070,419 B2 * | 9/2018 | Huang ................... | H04W 76/16 |
| 2008/0249957 A1 * | 10/2008 | Masuyama ............ | G06Q 40/06 |
| | | | 705/36 R |

FOREIGN PATENT DOCUMENTS

CN    102934390 A  *  2/2013  ............. G09G 5/006

OTHER PUBLICATIONS

Copeland, "What is the Efficient Frontier and How Do You Calculate It?" Oct. 20, 2021 (Year: 2021).*
L. Cheng, B. A. Huberman and M. Xu, "Portfolio Theory in Millimeter-Wave Coordinated Multi-Point Transmission," 2021 IEEE Radio and Wireless Symposium (RWS), 2021, pp. 133-136, doi: 10.1109/RWS50353.2021.9360382. (Year: 2021).*

* cited by examiner

*Primary Examiner* — William D Cumming
(74) *Attorney, Agent, or Firm* — Elevated IP, LLC (57) ABSTRACT

The telecommunications systems, software, and methods are for power-efficient coordinated multipoint transmission, particularly in millimeter-wave small cells. The systems, software, and methods apply portfolio theory to determine an allocation of power to a plurality of transmitters in communication with one or more receivers in a joint transmission configuration, such as a MMW or BF-MMW joint transmission configuration. The systems, software, and methods apply portfolio theory to determine an allocation of power to a plurality of transmitters such that a mean received power, associated with a certain level of variance, is maximized, or the variance of received power, associated with a certain level of mean received power, is minimized.

20 Claims, 12 Drawing Sheets

POWER-EFFICIENT COORDINATED MULTIPOINT TRANSMISSION IN MILLIMETER-WAVE SMALL CELLS-POWER

CROSS-REFERENCE TO RELATED APPLICATIONS

This application claims the benefit of and priority to U.S. Provisional Patent Application Nos. 63/003,361, filed Apr. 1, 2020, and 63/006,251, filed Apr. 7, 2020, each of which is hereby incorporated by reference in its entirety.

STATEMENT REGARDING FEDERALLY SPONSORED RESEARCH

None.

BACKGROUND

The millimeter wave (MMW) band of the spectrum, between 30 GHz and 300 GHz, is a relatively new bandwidth in telecommunications. This band has the potential to expand network capacity, improve coverage for hard-to-access areas (e.g., indoor areas and rural areas), increase data speeds, and decrease infrastructure costs. However, MMW technology is most suitable for implementation in localized cells at the edge of the network due to the fact that millimeter waves do not propogate over large distances. In the localized (small) cells, user terminals communicate (typically wirelessly) with a small cell node in the MMW band. The small cell node then communicates with a macro node, such as an eNodeB or base station, at standard frequencies, to access the backhaul portion of the network.

Despite the promise of MMW systems, they suffer from some drawbacks, such as lower power efficiency because of high-frequency circuits and path loss. To address this issue, directional antennae and beamforming are often used to reduce power loss in unnecessary directions. In beamformed millimeter-wave (BF-MMW) small cells, robustness problems attributed to the characteristics of BF-MMWs exist because the quality of BF-MMW communications is sensitive to environmental conditions. For instance, obstacles in the line-of-sight (LoS) path between a BF-MMW transmitter (Tx) and receiver (Rx) may cause complete transmission failure, especially for frequencies that have low penetrability and high path losses. Therefore, establishing multiple LoS links is recommended as a way to achieve redundant paths. In addition, cell densification leads to decreased utilization and cell sizes, making the network less efficient in terms of infrastructure investment. As a result, coordinated multipoint (CoMP) transmission of multiple BF-MMW cells is a recommended solution to increasing power efficiency, communication robustness, and network efficiency.

There are multiple categories of downlink CoMP transmission, including joint transmission and coordinated beamforming/scheduling. Joint transmission needs channel state information (CSI) for precoding. In radio frequency (RF) wireless communications, the CSI represents the combined effect of scattering, fading, power attenuation, etc. CSI varies significantly over both time and frequency. In BF-MMW systems on the other hand, the channel is fairly flat with very slow CSI variation. This allows the channel response to be represented in a simpler form that could aid the optimization of joint transmission.

SUMMARY

The present disclosure generally relates to telecommunications systems, software, and methods for power-efficient coordinated multipoint transmission, particularly in millimeter-wave small cells. The disclosed systems, software, and methods apply portfolio theory to determine an allocation of power to a plurality of transmitters in communication with one or more receivers in a joint transmission configuration, such as a MMW or BF-MMW joint transmission configuration. The disclosed systems, software, and methods apply portfolio theory to determine an allocation of power to a plurality of transmitters such that a mean received power, associated with a certain level of variance, is maximized, or the variance of received power, associated with a certain level of mean received power, is minimized.

In an aspect, a method for transmitting data from a plurality of millimeter wave (MMW) small cells comprises: providing a first MMW transmitter and a second MMW transmitter in operable communication with a common receiver; and instructing the first MMW transmitter and the second MMW transmitter to each transmit data to the common receiver at a portion of a total power corresponding to a ratio on an efficient frontier of mean power received at the common receiver as a function of power allocation. In an embodiment, the coded data is at least partially redundant or repetitive.

In an embodiment, a transmitter, such as the first transmitter and/or the second transmitter, is a set of multiple transmitters. In an embodiment, a method or system disclosed herein includes three, four, five or more transmitters, where power allocated to each individual transmitter within the plurality of transmitters is determined according to the methods disclosed herein.

In an embodiment, the common receiver may be a plurality of common receivers.

In an embodiment, the data is at least partially redundant data. In an embodiment, data is space and time or space and frequency diversified. In an embodiment, data is space-time coded or space-frequency coded. In an embodiment, data is space-time block coded or space-frequency block coded. In some embodiments, space-time block coding (STBC) or space-frequency block coding (SFBC) is used as the precoding method for joint transmission. In an embodiment, a common receiver is a user equipment and the first and the second MMW transmitters are small cell nodes. Exemplary user equipment includes but is not limited to computers, laptops, tablets, mobile phones, and smart phones.

In an embodiment, the first transmitter and/or the second transmitter transmit(s) beamformed millimeter-waves (BF-MMWs).

In an aspect, a telecommunications network comprises a first millimeter wave (MMW) transmitter, a second MMW transmitter, a common receiver in operable communication with the first MMW transmitter and the second MMW transmitter, and a processor configured to instruct the first MMW transmitter and the second MMW transmitter to each transmit data to the common receiver at a portion of a total power corresponding to a ratio on an efficient frontier of mean and variance of power received at the common receiver as a function of power allocation.

In an embodiment, the telecommunications network further comprises a macro cell in operable communication with the first MMW transmitter and the second MMW transmitter and with a network core.

In an embodiment, transmissions across the network conform to a networking protocol selected from the group consisting of Data Over Cable Service Interface Specification (DOCSIS), IEEE Std. 802, 3G, 3GPP, 3GPP2, 4G, 5G, and LTE/LTE-A.

In an aspect, a method of allocating power to a plurality of transmitters comprises: identifying a first transmitter and a second transmitter in communication with a common receiver; transmitting test data from the first transmitter and the second transmitter to the common receiver with overall power split between the first transmitter and the second transmitter according to a plurality of power ratios between 0 and 1; measuring power received at the common receiver; calculating mean and variance of the power received for each of the power ratios; determining an efficient frontier of mean and variance of power received at the common receiver as a function of power allocation; and allocating power to the first transmitter and the second transmitter at an applied power ratio corresponding to the efficient frontier.

In an embodiment, a method of allocating power to a plurality of transmitters comprises transmitting downlink data to a user equipment (UE) from the first transmitter and the second transmitter with power allocated according to the applied power ratio.

In an embodiment, the first transmitter and/or the second transmitter transmit(s) at frequencies between 30 GHz and 300 GHz.

In an embodiment, test data is applied to the system periodically, e.g., according to a schedule, or upon request from a device or user input.

In an aspect, a non-transitory computer-readable medium has a plurality of non-transitory instructions executable with a processor to allocate power to a plurality of transmitters, the plurality of non-transitory instructions being executable for: instructing a first transmitter and a second transmitter to transmit test data to a common receiver with overall power split between the first transmitter and the second transmitter according to a plurality of power ratios between 0 and 1; obtain received power data from the common receiver; calculate mean and variance of the received power data for each of the power ratios; determine an efficient frontier of mean power received at the common receiver as a function of power allocation; and allocate power to the first transmitter and the second transmitter at an applied power ratio corresponding to the efficient frontier.

In an embodiment, all of the transmitters within a plurality of transmitters are connected to a common/single power source (e.g., a battery or battery bank). In another embodiment, transmitters within a plurality of transmitters are connected to two or more different power sources, and "total power" or "overall power" is used as a mathematical construct to calculate energy constraints and savings.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, 4G, 5G, LTE/LTE-A, WAP, SIP, UDP, FTP, RTP/RTCP, H.323, etc.).

As used herein, "space-time block coding (STBC)" refers to a method of data transmission in wireless communication systems where multiple antennas are used to transmit multiple, redundant copies of a data stream to a receiver as encoded blocks of data. The encoded blocks of data are time and space diversified.

As used herein, "space-frequency block coding (SFBC)" refers to a method of data transmission in wireless communication systems where multiple antennas are used to transmit multiple, redundant copies of a data stream to a receiver as encoded blocks of data. The encoded blocks of data are frequency and space diversified.

The term "transmitter" is used throughout this document to refer to a device that is capable of transmitting an electromagnetic signal, such as a radio frequency (RF) signal. However, this terminology is not meant to limit the functionality of the devices disclosed herein, which may also be capable of receiving electromagnetic signals and performing other functions.

The terms "direct and indirect" describe the actions or physical positions of one object relative to another object. For example, an object that "directly" acts upon or touches another object does so without intervention from an intermediary. Contrarily, an object that "indirectly" acts upon or touches another object does so through an intermediary (e.g., a third component).

Figure 1:
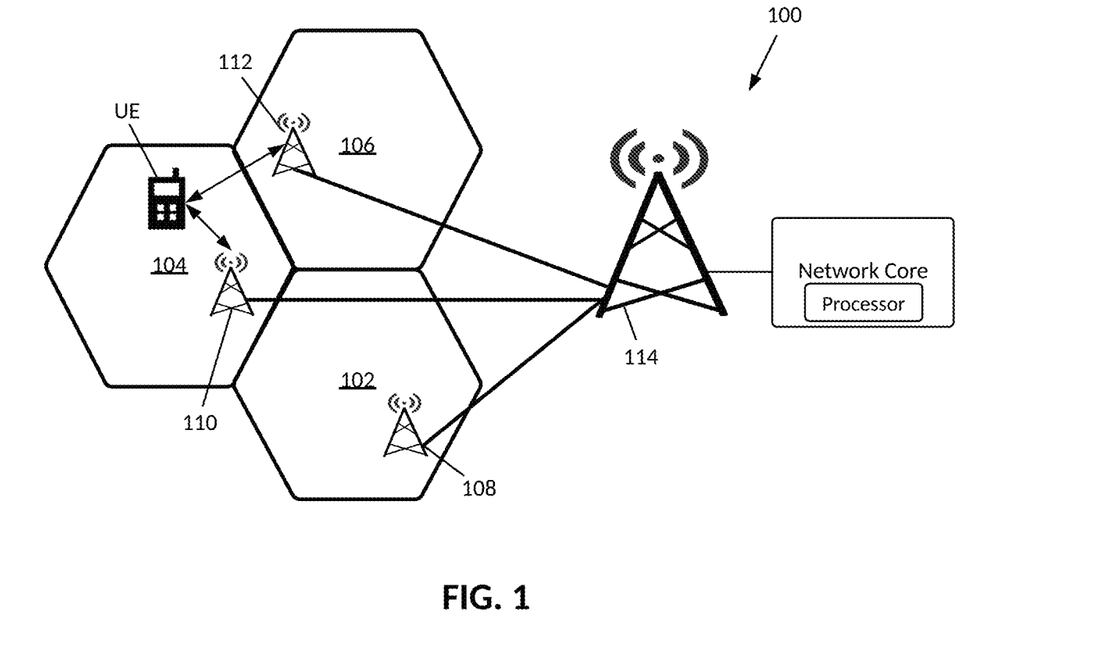
FIG. 1 is a schematic diagram of an exemplary network including several small cells.

FIG. 1 is a schematic diagram of an exemplary network 100 including several small cells 102, 104, 106. Each small cell includes a small cell node 108, 110, 112 operably connected to a base station 114, for example, through fiber. Base station 114, which may be an eNodeB or other macro cell, is operably connected directly or indirectly to a network core. As shown, user equipment (UE) in the vicinity of small cell 104 is able to communicate, for example, using the millimeter wave band and potentially via BF-MMW signals, with small cell nodes 110 and 112. In such a case, joint transmission from small cell nodes 110 and 112 to the UE may improve network performance and robustness. Methods for determining allocations of power between joint transmitters are described herein.

In some embodiments, received power from multiple transmitters (e.g., small cell nodes) at a common receiver, such as UE, is reported to a processor, which is shown within the network core, but which may reside in the UE, in a small cell node 108, 110, 112, in base station 114, and/or within another component of the network. The processor is configured to determine a power allocation between the multiple transmitters that maximizes a mean received power, associated with a certain level of variance, or minimizes the variance of received power, associated with a certain level of mean received power, or to otherwise identify a power allocation on an efficient frontier of the mean and the variance of power received at the common receiver as a function of power allocation. A power allocation (power ratio) for implementation may be selected from any point on the efficient frontier, where the selection is random or otherwise made to satisfy network criteria and/or operation demands, such as power consumption criteria, signal integrity metrics (e.g., SINR), and receiver sensitivity and dynamic range.

In an embodiment, a test sequence comprising test data transmitted from multiple transmitters at a plurality of power ratios may be initiated by a small cell node, a base station, a network core, or another component of the network at a scheduled interval or upon request, e.g., from a UE. After completion of the test sequence, instructions are sent to each transmitter, e.g., via a control signal, and power at each transmitter is set, e.g., by an attenuator or potentiometer, to the power output specified in the instructions. When the processor resides within a device capable of sending a control signal (e.g., a base station or the network core), the instructions for power output settings for the test data or optimal/selected power allocation may be sent directly to the transmitters. However, when the processor resides within a device that is not capable of sending control signals, e.g., UE, a request to have the transmitters set their outputs according to the test sequence or the optimal/selected power allocation may be sent from the device (e.g., UE) to a component of the network that is capable of sending control signals to the transmitters.

Portfolio Theory for Power Allocation

Portfolio theory utilizes mean-variance analysis to allocate resources in a manner that maximizes the return on the resource while minimizing variance, which represents risk that the resource will be under-utilized, wasted or depleted. Here, power is allocated to a plurality of transmitters to maximize overall power utilization in the form of successful transmissions from the transmitters to a receiver. At the same time, variance of received power is minimized because a larger variance represents a greater risk of signal instability and/or a greater risk that an attempted transmission will be blocked and not received by the receiver, thereby requiring re-transmission which wastes the resource (power).

An efficient frontier is created by scenarios that satisfy the condition that no other power allocation will produce more successful transmissions (a higher mean received power or higher expected return on the resource) with the same variance/standard deviation. Given the efficient frontier, one can choose a level of risk, in this case, risk that a transmission is unstable or not received by the receiver, and allocate power accordingly or one can choose a particular power allocation from the efficient frontier and determine whether the risk is acceptable. In many cases, the lowest risk of transmission failure will be selected and implemented, but it is also possible to select a scenario with an increased risk of transmission failure or instability (i.e., a higher variance), in order to increase mean received power or to allocate less power to transmitters for a required reception power.

Figure 2:
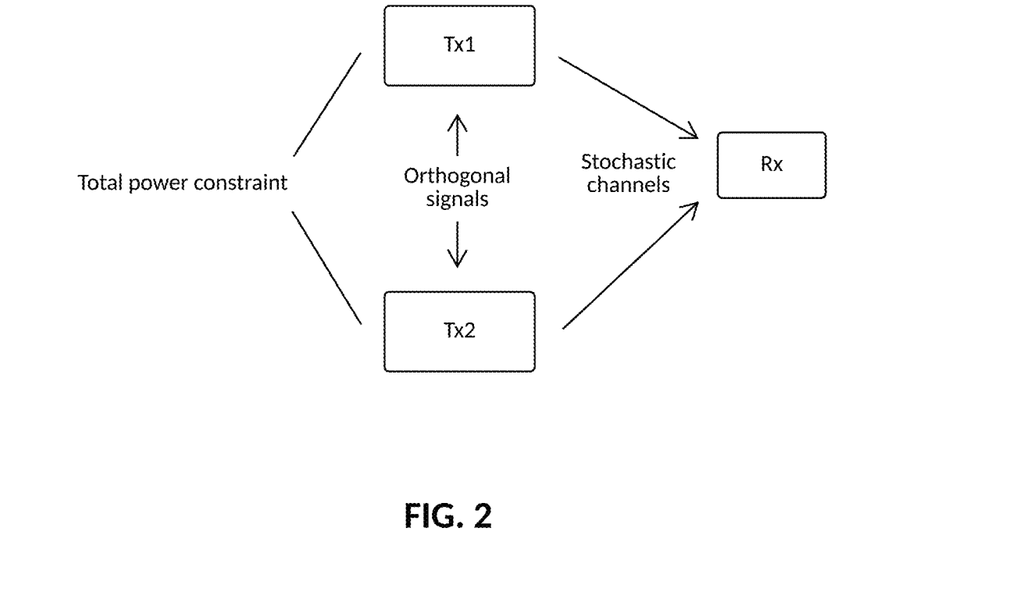
FIG. 2 is a schematic diagram demonstrating portfolio theory in a 2×1 transmission system.
Figure 3:
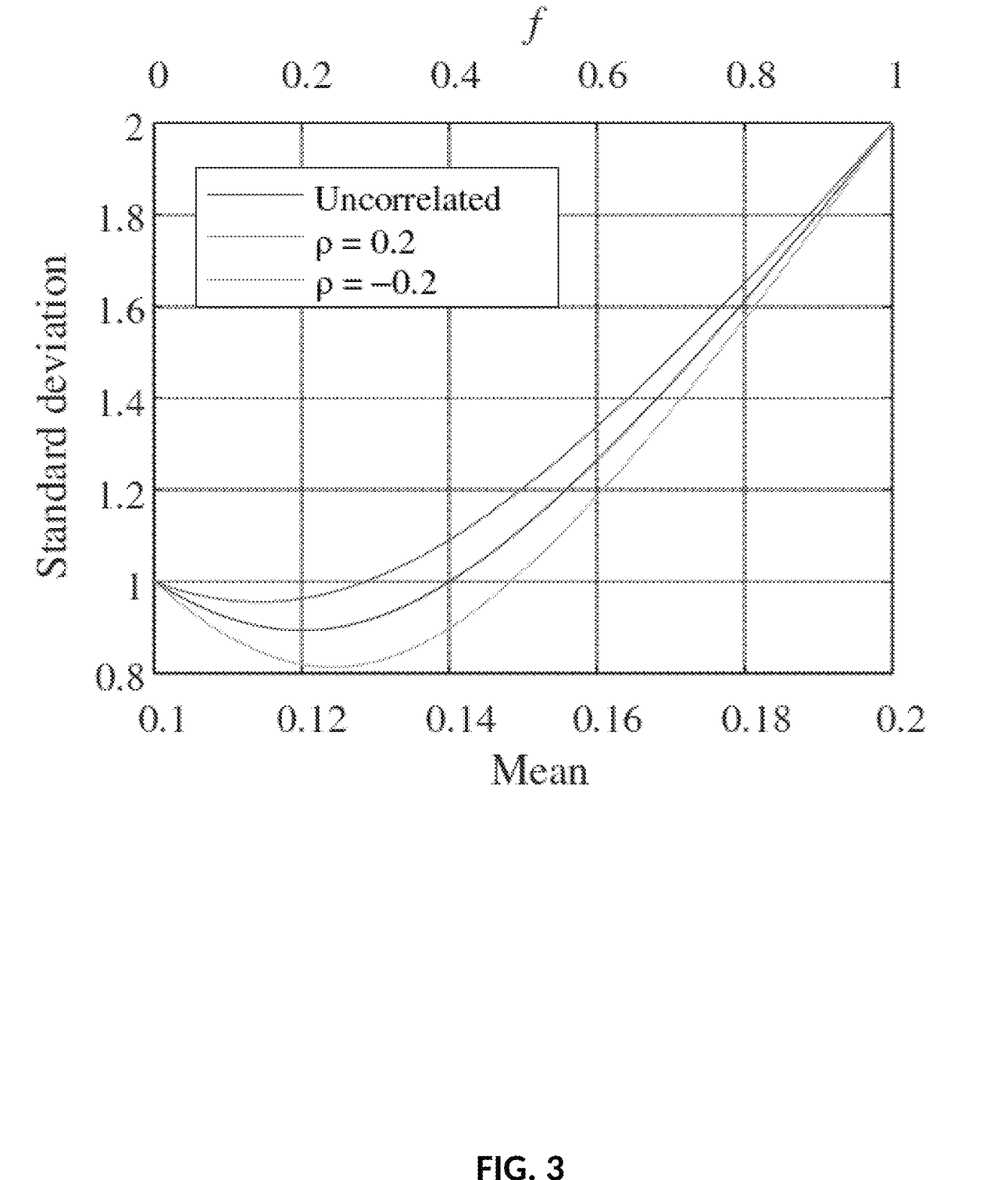
FIG. 3 is a graph of mean versus standard deviation of received power.

Using a 2×1 downlink transmission as an example, as shown in FIG. 2, a decision must be made about how to allocate power to these two channels when the total power is constrained. Since the channels are stochastic, the objective of the allocation is to increase the expectation and decrease the variance of received power. The expectation of the received power is $$u = fu_1 + (1-f)u_2$$

and the variance of the received power is $$\sigma^2 = f^2\sigma_1^2 + (1-f)^2\sigma_2^2 + 2\rho f(1-f)\sigma_1\sigma_2$$

where $u_1$ and $\sigma_1^2$ are the expectation and variance, respectively, when all the power is allocated to transmitter 1 (Tx1), and $u_2$ and $\sigma_2^2$ are the expectation and variance when all the power is allocated to transmitter 2 (Tx2). f(0<f<1) is the fraction of the power allocated to Tx1. ρ is the correlation coefficient between the two channels. Assuming $u_1=0.1$, $u_2=0.2$, $\sigma_1=1$, and $\sigma_2=2$, FIG. 3 shows the mean-standard deviation curves as the allocation is changed from 0<f<1. One can choose an optimized point along a curve based on deterministic factors such as receiver sensitivity.

Most importantly, only points on the efficient frontier, i.e. the region on the right side of the minimum, should be chosen for beneficial implementation.

STBC with Portfolio

A CoMP transmission system shares the same structure as that shown in FIG. 2. To guarantee the orthogonality between the two signals, STBC is applied.

Figure 4:
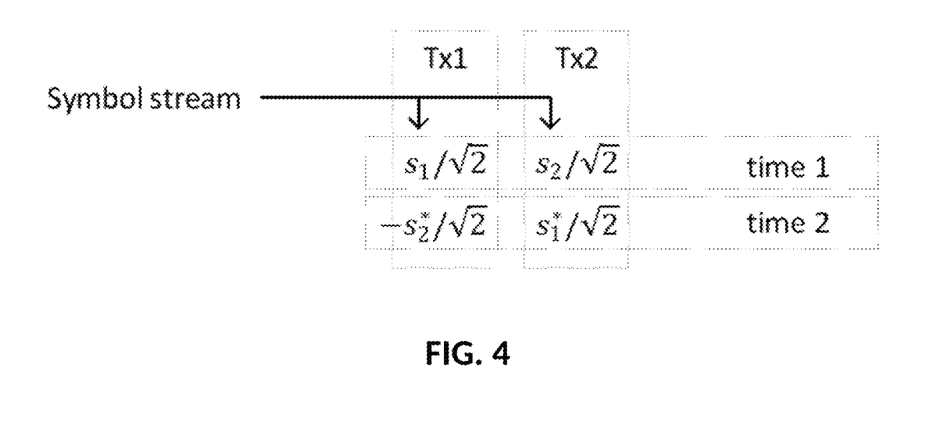
FIG. 4 is a diagram of traditional STBC.

In traditional STBC, the transmitted symbols are pre-coded as shown in FIG. 4. The received symbols are $$\begin{pmatrix} r_1 \\ r_2 \end{pmatrix} = \begin{pmatrix} s_1/\sqrt{2} & s_2/\sqrt{2} \\ -s_2^*/\sqrt{2} & s_1^*/\sqrt{2} \end{pmatrix} \begin{pmatrix} h_1 \\ h_2 \end{pmatrix} + n$$

where $h_1$ and $h_2$ are the channel responses of the two stochastic channels and n is noise. This equation can be re-written as $$\begin{pmatrix} r_1 \\ r_2^* \end{pmatrix} = \begin{pmatrix} h_1/\sqrt{2} & h_2/\sqrt{2} \\ h_2^*/\sqrt{2} & -h_1^*/\sqrt{2} \end{pmatrix} \begin{pmatrix} s_1 \\ s_2 \end{pmatrix} + n = H \begin{pmatrix} s_1 \\ s_2 \end{pmatrix} + n$$

Figure 5:
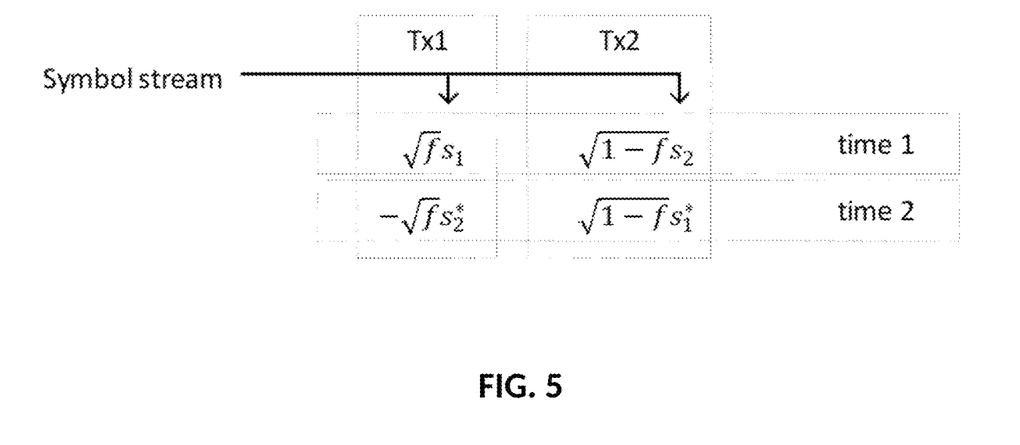
FIG. 5 is a diagram of STBC with portfolio power allocation, according to an embodiment.

To add the portfolio theory mechanism into STBC, the transmitted symbols are pre-coded with weighing terms of 0<f<1, meaning a portion f of the total power is allocated to Tx1 and the rest to Tx2. The transmitted symbols are pre-coded as shown in FIG. 5.

The received symbols are $$\begin{pmatrix} r_1 \\ r_2 \end{pmatrix} = \begin{pmatrix} \sqrt{f}s_1 & \sqrt{1-f}s_2 \\ -\sqrt{f}s_2^* & \sqrt{1-f}s_1^* \end{pmatrix} \begin{pmatrix} h_1 \\ h_2 \end{pmatrix} + n$$

-continued $$\Rightarrow \begin{pmatrix} r_1 \\ r_2^* \end{pmatrix} = \begin{pmatrix} \sqrt{f} h_1 & \sqrt{1-f} h_2 \\ \sqrt{1-f} h_2^* & -\sqrt{f} h_1^* \end{pmatrix} \begin{pmatrix} s_1 \\ s_2 \end{pmatrix} + n = H' \begin{pmatrix} s_1 \\ s_2 \end{pmatrix} + n$$

Generalizing from H to H' does NOT change the condition number of the matrix:

κ(H')=κ(H)=1

A condition number of 1 ensures the inverse of H' always exists for any given $h_1$, $h_2$, and f. Therefore, the zero-forcing estimate of symbols at the receiver is $$\begin{pmatrix} \hat{s}_1 \\ \hat{s}_2 \end{pmatrix} = H'^{-1} \begin{pmatrix} r_1 \\ r_2^* \end{pmatrix} = \begin{pmatrix} s_1 \\ s_2 \end{pmatrix} + H'^{-1} n$$

For any given $h_1$, $h_2$, and f, a condition number of 1 also ensures that the equation is not sensitive to noise and the contribution of noise is not enlarged by an ill-conditioned matrix. Since H is stochastic, portfolio theory can be used to further reduce the contribution of noise by minimizing the expectation and variance of the determinant of $H'^{-1}$. In other words, the equation maximizes the expectation and minimizes the variance of the determinant of H'.

This is equivalent to maximizing the expectation and minimizing the variance of the power of the received symbols $$\left\| \begin{pmatrix} \sqrt{f} h_1 & \sqrt{1-f} h_2 \\ \sqrt{1-f} h_2^* & -\sqrt{f} h_1^* \end{pmatrix} \begin{pmatrix} s_1 \\ s_2 \end{pmatrix} \right\|^2 = (f|h_1|^2 + (1-f)|h_2|^2) \begin{pmatrix} 1 \\ 1 \end{pmatrix}$$

assuming the original symbols $s_1$ and $s_2$ are power normalized.

To optimize, the variable f is scanned to get the efficient frontier and to find the optimal power allocation. This is demonstrated in the following examples, which are for illustrative purposes only and are not intended to limit the invention.

In the following examples, first and second transmitters (Tx1, Tx2) may be small cell nodes that are both within range of a receiver (Rx), which may be a user equipment (UE). Thus, for example, joint transmission may be implemented as two or more small cell nodes transmitting the same, redundant data blocks to a UE (i.e., a downlink transmission) with power split between the two or more transmitters according to a power ratio determined using methods disclosed herein, which invoke portfolio theory.

Example 1

For simplicity and based on the nature of BF-MMW channels, we assume that channel responses are only affected by blockage. In this example, for channel 1 from Tx1 to Rx, there is a 0.9 probability that the channel is not blocked. The response of a LoS link is a flat complex number of 0.1+0.9j; there is a 0.1 probability that the channel is totally blocked and cannot receive anything. Similarly, the probability is 0.92 and the LoS response is 0.8+0.1j for channel 2.

$h_1$=(0.1+0.9j)B(0.9)

$h_2$=(0.8+0.1j)B(0.92)

Figure 6:
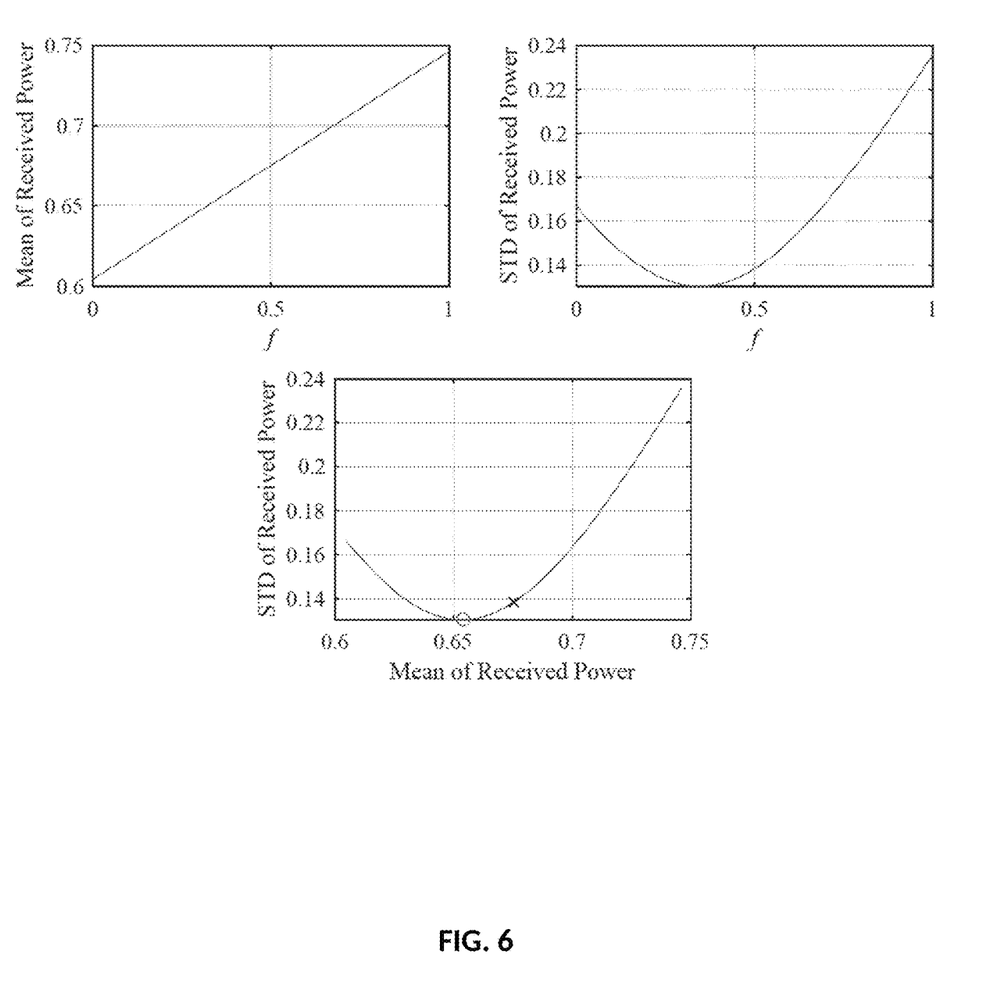
FIG. 6 shows graphs corresponding to the portfolio of Example 1.

With some random number generated following the distribution above, a curve as shown in FIG. 6 is obtained. The efficient frontier is on the right side of the minimum which is when f=0.35. This indicates that always allocating more than 35% of the total power to Tx1 provides the best transmission results.

Example 2

In this example, Tx1 experiences more frequent blockage than the system of Example 1. For channel 1 from Tx1 to Rx, there is a 0.7 probability that the channel is not blocked. Channel 2 remains unchanged relative to Example 1.

$h_1$=(0.1+0.9j)B(0.3)

$h_2$=(0.8+0.1j)B(0.92)

Figure 7:
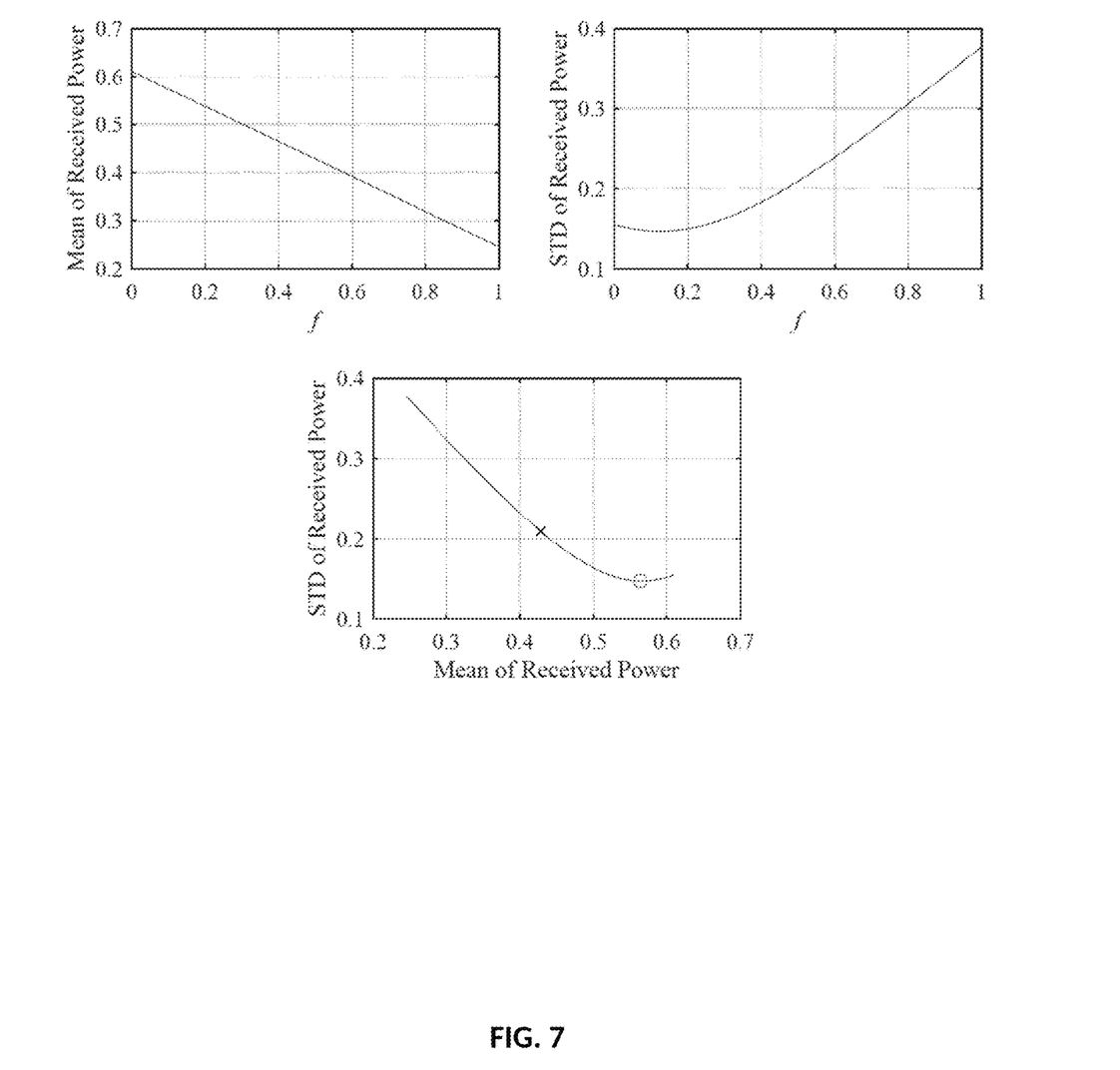
FIG. 7 shows graphs corresponding to the portfolio of Example 2.

Traditional STBC, without portfolio theory, marked by a cross in FIG. 7, provides a mean of 0.43 and a STD of 0.21. However, this point is outside the efficient frontier and thus not optimal. On the other hand, if portfolio theory is followed, we can improve the mean received power to 0.56 and reduce its STD to 0.15. This indicates that portfolio theory should always be implemented over traditional STBC in certain channel conditions in order to avoid power inefficiency.

Example 3

Figure 8:
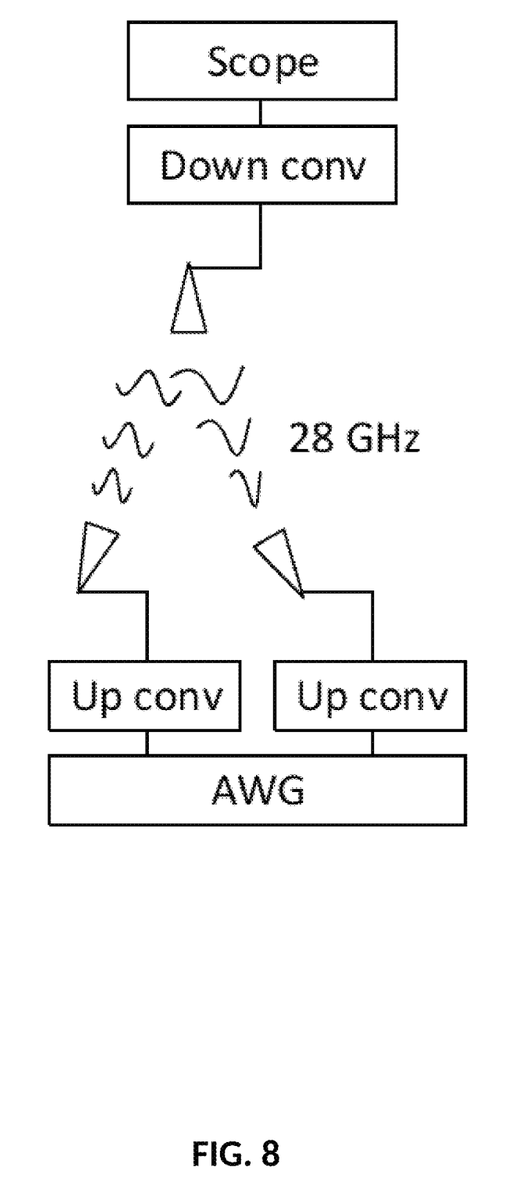
FIG. 8 is a schematic diagram of the experimental set-up described in Example 3.

In this section, we experimentally verify the feasibility of the proposed method. The experimental setup is illustrated in FIG. 8. Two streams of baseband signal are generated by using an arbitrary waveform generator (AWG) and then upconverted to a MMW frequency of 28 GHz. Ka-band horn antennae are used for wireless transmission. At the receiver, the signal is down-converted to baseband using IQ downconverter. The baseband IQ signal is sampled at 100 MSa/s using two real-time oscilloscope channels.

The transmission contains continuous subframes. Each subframe consists of 12 OFDM symbols (extended CP) with a baseband bandwidth of 10 MHz and subcarrier spacing of 15 kHz. The OFDM symbols consist of pilot and data subcarriers. STBC is applied on data subcarriers between every two adjacent OFDM symbols.

Figure 9:
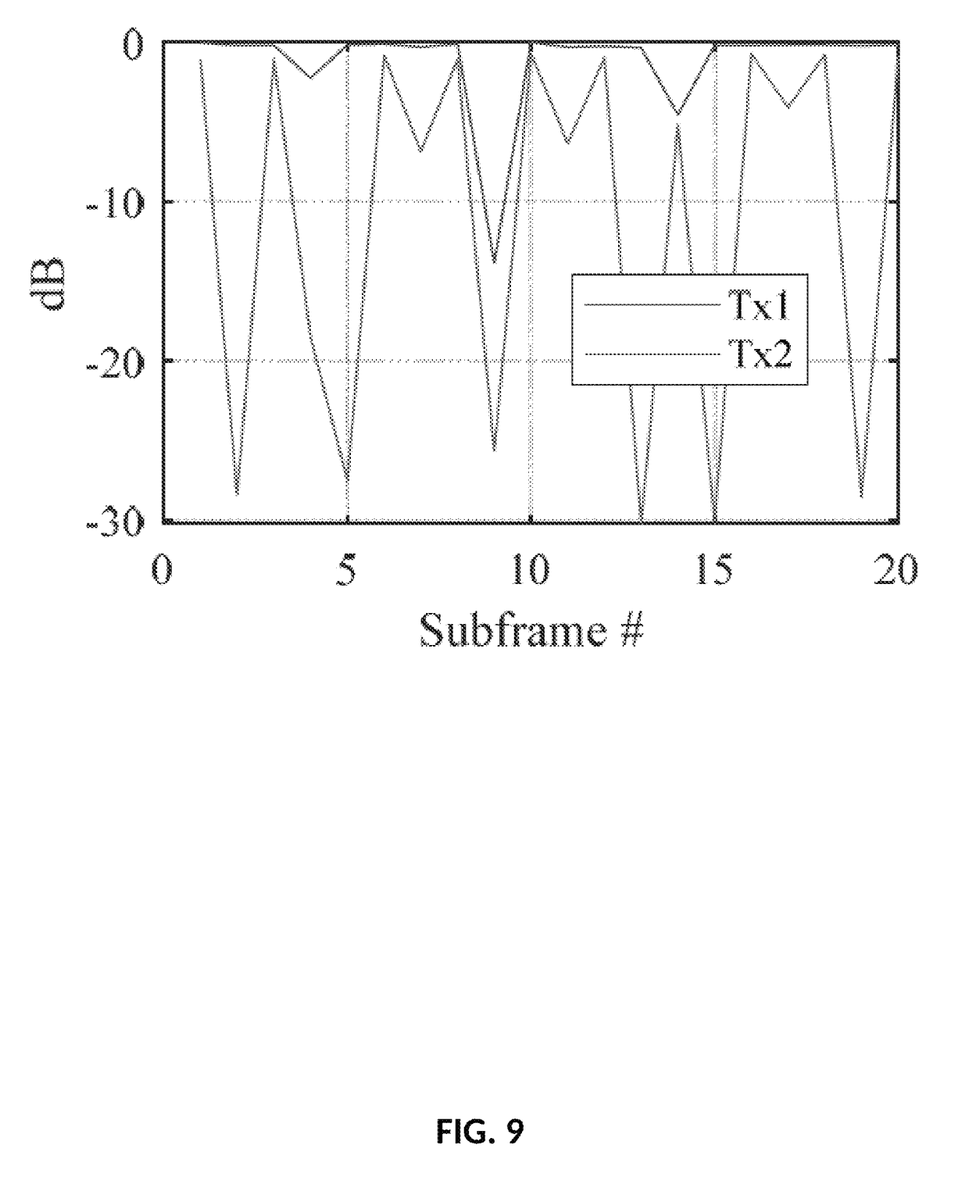
FIG. 9 shows received power from two transmitters.
Figure 10:
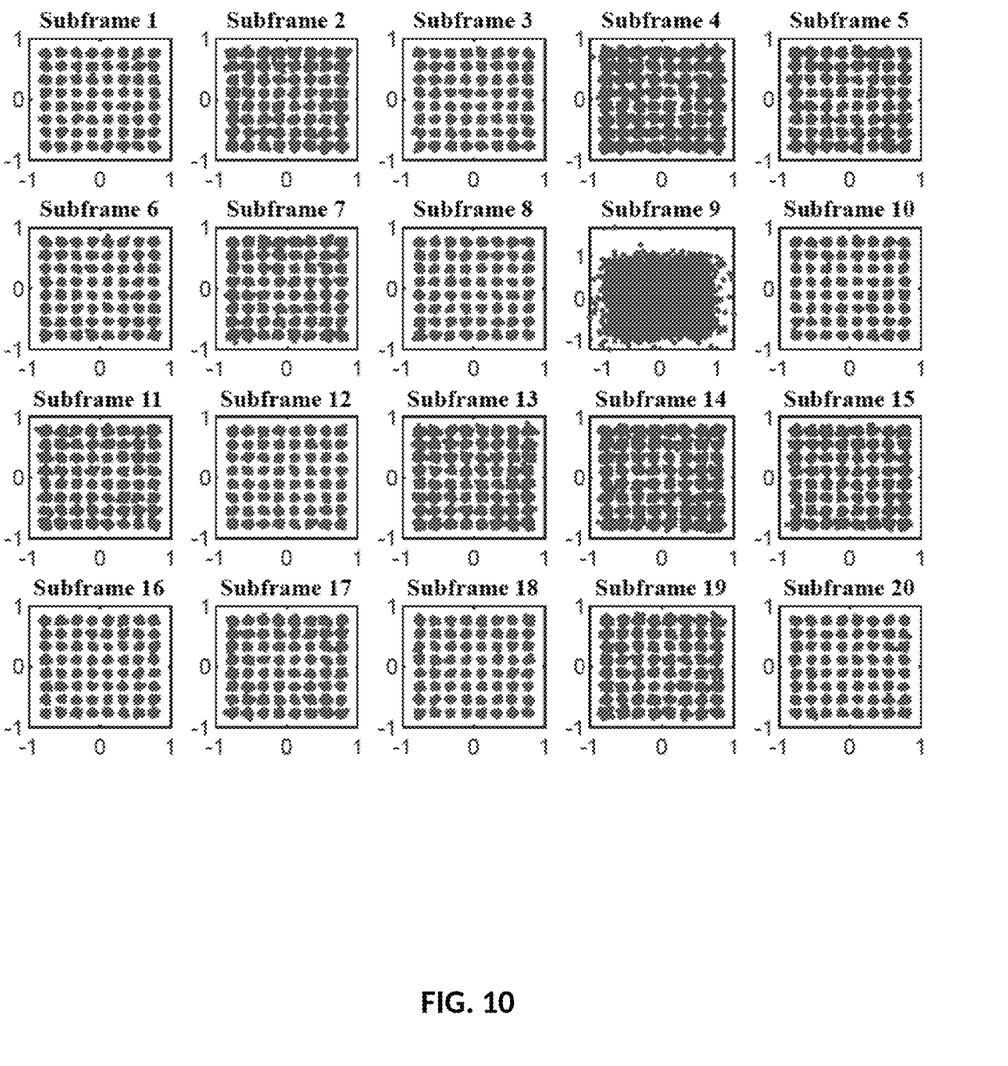
FIG. 10 shows STBC decoded constellations of 20 subframes.

The two transmitters are initially set to transmit at equal power. During the transmission, the line-of-sight links between the two transmitters and the receiver are randomly blocked. The receiver randomly samples 20 subframes over time. From the pilot subcarriers, the average power from each transmitter is measured at each subframe, as plotted in FIG. 9. From the data subcarriers, the STBC is decoded by zero-forcing. The constellations of the 20 subframes are plotted in FIG. 10.

Figure 11:
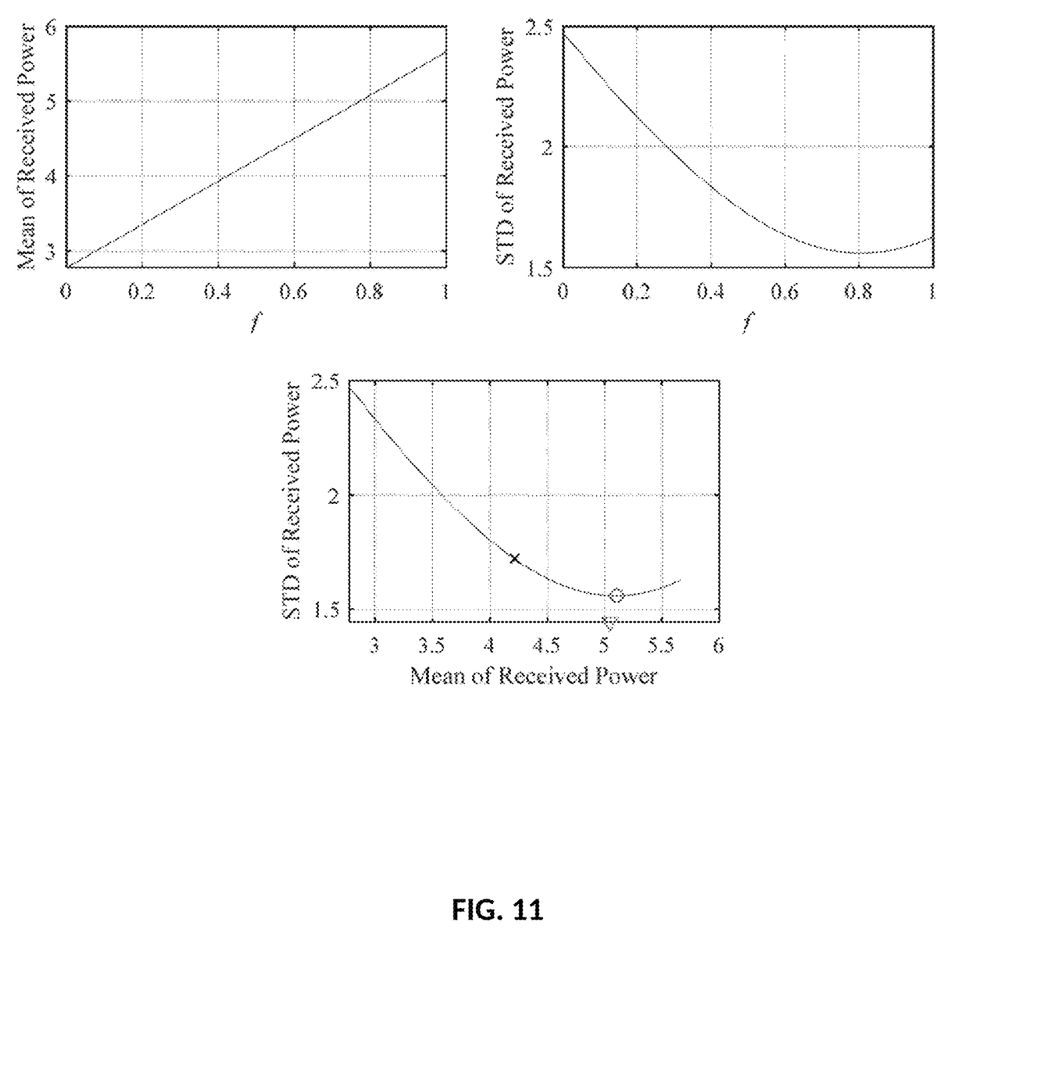
FIG. 11 shows graphs corresponding to the portfolio of Example 3.

From the two power measurement sequences, portfolio theory was used to optimize the power allocation between the two transmitters under this blockage pattern. The results are shown in FIG. 11. The current allocation with f=0.5, marked by a cross in FIG. 11, is outside the efficient frontier. The efficient frontier is distinguished by the point where f=0.8, marked by a circle. Therefore, more than 80% of the total power should be allocated to Tx1.

Figure 12:
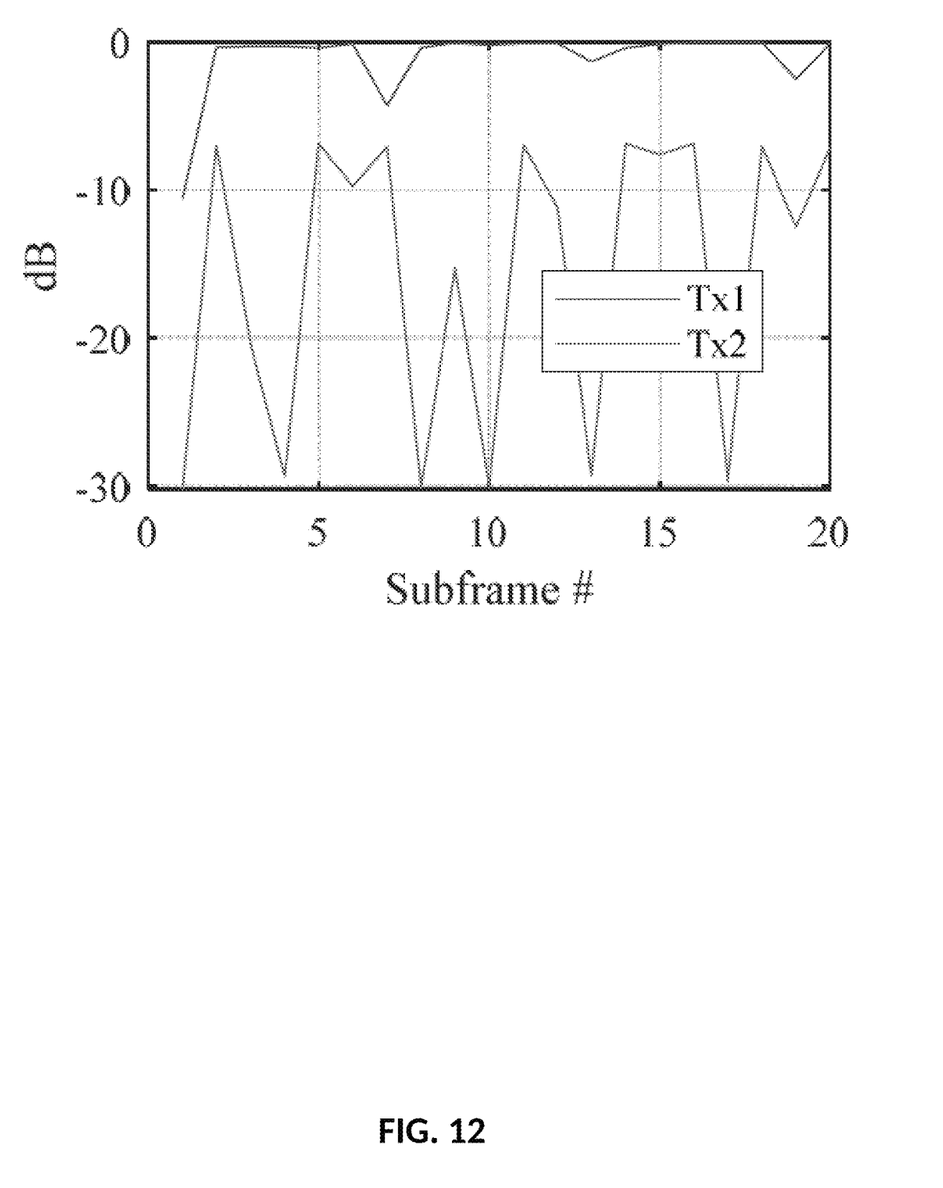
FIG. 12 illustrates received power from two transmitters after the portfolio allocation of Example 3.

To verify this conclusion, the power between the two transmitters was re-allocated to f=0.8 by tuning the amplifiers inside the up-converters (one was increased by 4 dB and the other was decreased by 2 dB) and sampling another 20 subframes. During the transmission, the links were randomly blocked with a pattern similar to that previously used, i.e. to emulate an independent and identically distributed pattern. The measured power from pilot subcarriers is shown in FIG. 12. The mean and STD of the combined received power are marked as a triangle in FIG. 11, showing improved average received power and reduced power variation compared with traditional f=0.5 allocation. The triangle is minorly biased from its target location, i.e. the circle. This is due to the change of blockage patterns.

Figure 13:
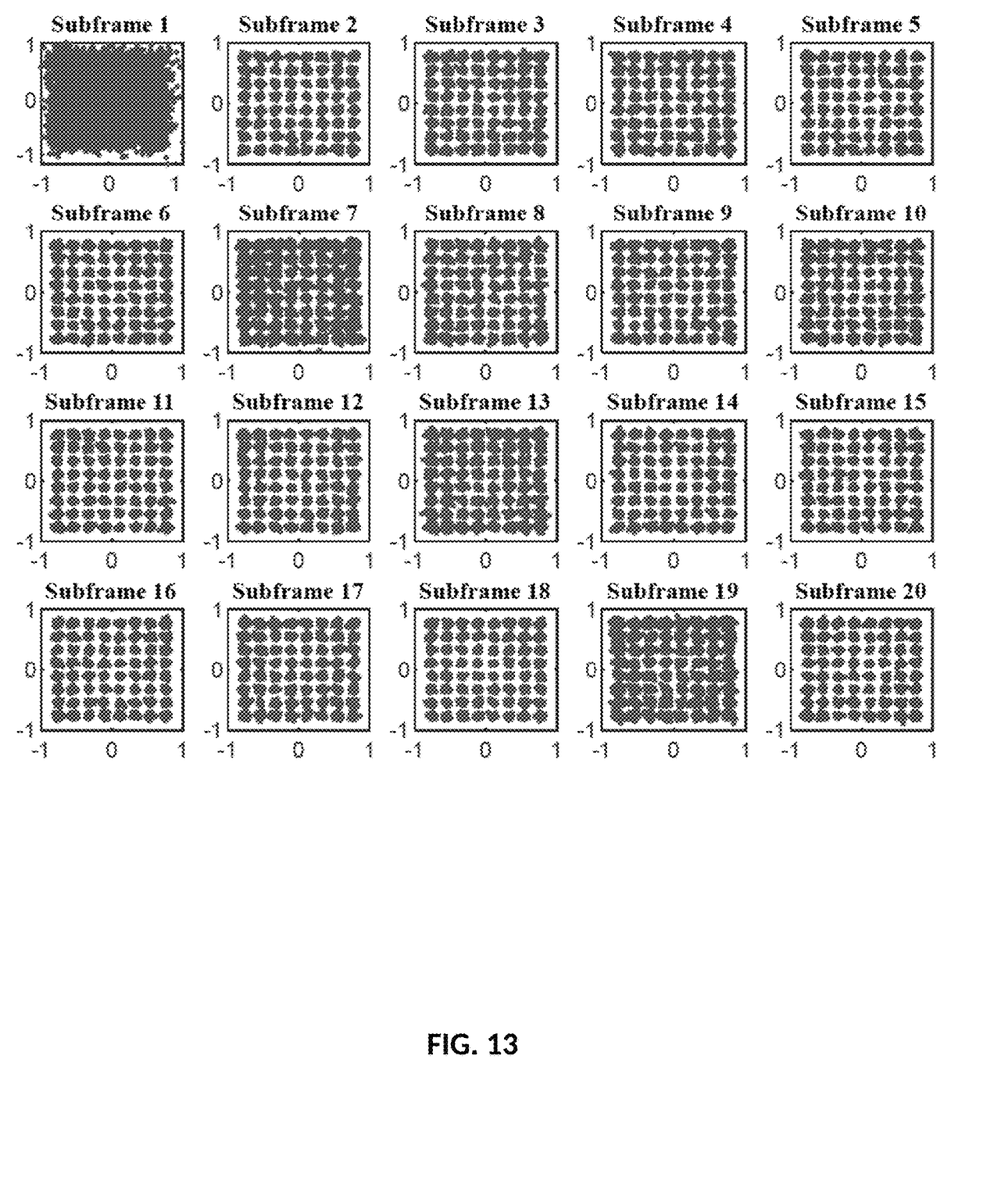
FIG. 13 shows STBC decoded constellations of 20 subframes with the portfolio allocation of Example 3.

From the data subcarriers, the STBC is successfully decoded by zero-forcing, proving that portfolio theory allocation does not impact STBC. The constellations of the 20 subframes are plotted in FIG. 13.

Figure 14:
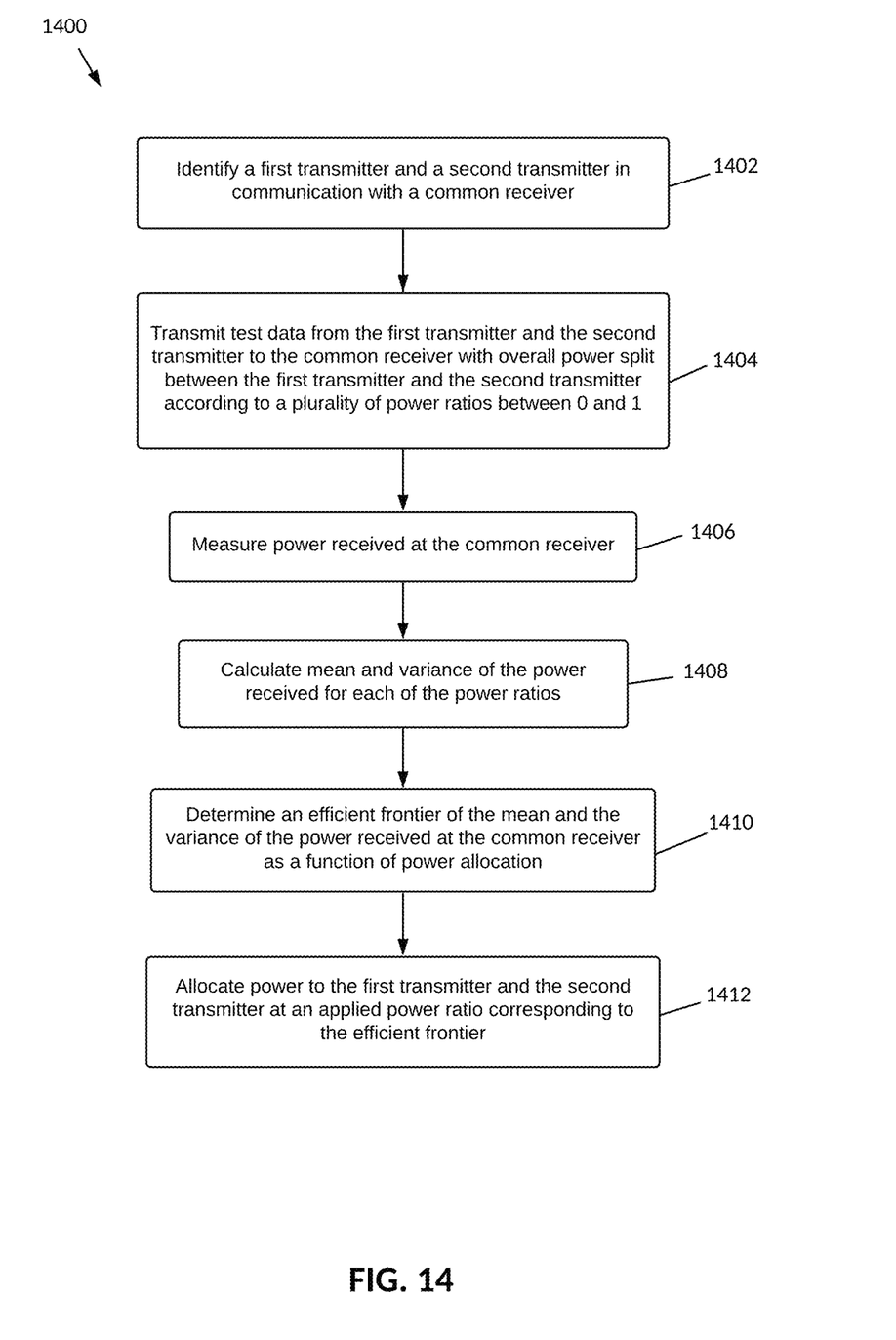
FIG. 14 is a flowchart of a method for allocating power to a plurality of transmitters in communication with a common receiver(s), according to an embodiment.

FIG. 14 is a flowchart 1400 illustrating steps in a method for allocating power to a plurality of transmitters in communication with a common receiver(s). This method utilizes portfolio theory to determine an applied power ratio on an efficient frontier, i.e., an applied power ratio that maximizes a mean received power, associated with a certain level of variance, at the common receiver(s). In step 1402, a first transmitter and a second transmitter in communication with a common receiver are identified. Test data is then transmitted from the first transmitter and the second transmitter to the common receiver with overall power split between the first transmitter and the second transmitter according to a plurality of power ratios between 0 and 1, in step 1404. In step 1406, power received at the common receiver is measured for each of the power ratios, and the mean and variance are calculated in step 1408. An efficient frontier of mean power received at the common receiver as a function of power allocation is determined in step 1410, and power to the first transmitter and the second transmitter is allocated at an applied power ratio corresponding to the efficient frontier, in step 1412.

The embodiments herein may be implemented in a variety of ways as a matter of design choice. In this regard, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from the computer readable medium providing program code for use by or in connection with a computer or any instruction execution system. For the purposes of this description, the computer readable medium can be any apparatus that can tangibly store the program for use by or in connection with the instruction execution system, apparatus, or device, including the computer system.

The medium can be any tangible electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system, suitable for storing and/or executing program code, can include one or more processors coupled directly or indirectly to memory through a system bus. The memory can include local memory employed during actual execution of the program code, bulk storage, and cache memories which provide temporary storage of at least some program code in order to reduce the number of times code is retrieved from bulk storage during execution. Input/output (I/O) devices (including but not limited to keyboards, displays, pointing devices, etc.) can be coupled to the system either directly or through intervening I/O controllers. Network adapters may also be coupled to the system to enable the computing system to become coupled to other data processing systems, such as through host systems interfaces, or remote printers or storage devices through intervening private or public networks. Modems, cable modem and Ethernet cards are just a few of the currently available types of network adapters.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method for transmitting data from a plurality of millimeter wave (MMW) small cells, the method comprising:
   providing a first MMW transmitter and a second MMW transmitter in operable communication with a common receiver; and
   instructing the first MMW transmitter and the second MMW transmitter to each transmit data to the common receiver at a portion of a total power corresponding to a ratio on an efficient frontier of mean and variance of power received at the common receiver as a function of power allocation.

2. The method of claim 1, wherein the first MMW transmitter and/or the second MMW transmitter is a set of multiple transmitters.

3. The method of claim 1, wherein the data is at least partially redundant data that is space and time diversified or space and frequency diversified.

4. The method of claim 1, wherein the data is space-time coded or space-frequency coded.

5. The method of claim 1, wherein the common receiver is a user equipment and the first and the second MMW transmitters are small cell nodes.

6. The method of claim 1, wherein the first MMW transmitter and the second MMW transmitter transmit beamformed millimeter-waves (BF-MMWs).

7. A telecommunications network comprising:
   a first millimeter wave (MMW) transmitter;
   a second MMW transmitter;
   a common receiver in operable communication with the first MMW transmitter and the second MMW transmitter; and
   a processor configured to instruct the first MMW transmitter and the second MMW transmitter to each transmit data to the common receiver at a portion of a total power corresponding to a ratio on an efficient frontier of mean and variance of power received at the common receiver as a function of power allocation.

8. The telecommunication network of claim 7, wherein the first MMW transmitter and/or the second MMW transmitter is a set of multiple transmitters.

9. The telecommunications network of claim 7 further comprising a macro cell in operable communication with the first MMW transmitter, the second MMW transmitter and a network core.

10. The telecommunications network of claim 7, wherein the data is at least partially redundant data that is space and time diversified or space and frequency diversified.

11. The telecommunications network of claim 7, wherein the data is space-time coded or space-frequency coded.

12. The telecommunications network of claim 7, wherein the common receiver is a user equipment and the first and the second MMW transmitters are small cell nodes.

13. The telecommunications network of claim 7, wherein transmissions across the network conform to a networking protocol selected from the group consisting of DOCSIS, IEEE Std. 802, 3G, 3GPP, 3GPP2, 4G, 5G, and LTE/LTE-A.

14. A method of allocating power to a plurality of transmitters comprising:
   identifying a first transmitter and a second transmitter in communication with a common receiver;
   transmitting test data from the first transmitter and the second transmitter to the common receiver with overall power split between the first transmitter and the second transmitter according to a plurality of power ratios between 0 and 1;
   measuring power received at the common receiver;
   calculating mean and variance of the power received for each of the power ratios;
   determining an efficient frontier of the mean and the variance of the power received at the common receiver as a function of power allocation; and
   allocating power to the first transmitter and the second transmitter at an applied power ratio corresponding to the efficient frontier.

15. The method of claim 14, wherein the first MMW transmitter and/or the second MMW transmitter is a set of multiple transmitters.

16. The method of claim 14, wherein the test data is at least partially redundant data that is space and time diversified or space and frequency diversified.

17. The method of claim 14, wherein the test data is space-time coded or space-frequency coded.

18. The method of claim 14, wherein the first transmitter and the second transmitter are millimeter-wave transmitters.

19. The method of claim 14, wherein the first transmitter and the second transmitter transmit beamformed millimeter-waves (BF-MMWs).

20. The method of claim 14 further comprising transmitting downlink data to a user equipment (UE) from the first transmitter and the second transmitter with power allocated according to the applied power ratio.

* * * * *